United States Patent [19]
Lee

[11] Patent Number: 5,852,522
[45] Date of Patent: Dec. 22, 1998

[54] DATA RECORDING APPARATUS FOR FAST DETECTION OF SERVO SECTORS AND CORRECTION OF TRACK ADDRESS USING A DIVIDED GRAY CODE AND A PARITY BIT

[75] Inventor: Kwang-Heui Lee, Suwon, Rep. of Korea

[73] Assignee: Samsung Electronics Co., Ltd., Suwon, Rep. of Korea

[21] Appl. No.: 661,492

[22] Filed: Jun. 11, 1996

[51] Int. Cl.⁶ .................................................. G11B 5/09
[52] U.S. Cl. ........................... 360/48; 360/78.14; 369/32
[58] Field of Search ........................... 360/48, 49, 77.08, 360/77.14; 371/51.1; 370/321; 345/3, 147, 150, 153; 711/112; 341/97, 16, 159, 110; 369/32, 47, 44.26

[56] References Cited

U.S. PATENT DOCUMENTS 5,381,281   1/1995   Shrinkle et al. ...................... 360/77.08

FOREIGN PATENT DOCUMENTS 3171476   7/1991   Japan .

Primary Examiner—Aristotelis M. Psitos
Assistant Examiner—Patrick Wamsley
Attorney, Agent, or Firm—Jones & Volentine, L.L.P.

[57] ABSTRACT

A servo sector forming method for fast detection and corresponding track address correcting method. The track address correcting method for a disk driving/recording apparatus uses as a recording medium a disk comprised of a plurality of track groups. A plurality of tracks are incorporated in each group, each having a data sector and a servo sector with a gray code field separated into a higH_ gray code field and a low-gray code field, a gap field for supplying the synchronization point of time and a parity bit field in which a group change information is recorded. The gray code read from the higH_ gray code field and low-gray code field is decoded during a track detection to detect a read address. A correction value for correcting a track address according to the track detection direction is added to the read address to detect the track address. Therefore, track detection time can be maintained in a high-capacity hard disk drive, irrespective of extension of a gray code field.

18 Claims, 7 Drawing Sheets

| GROUP | READ ADDRESS | | | GRAY CODE | | P | |
|---|---|---|---|---|---|---|---|
| | Dec | Hex | Hex | H_GRAY | L_GRAY | | |
| GROUP 1 | ⋮ 500 501 502 503 | ⋮ 1F4 1F5 1F6 1F7 | ⋮ 10E 10F 10D 10C | ⋮ 000100001 000100001 000100001 000100001 | ⋮ 110 111 101 100 | ⋮ 0 0 0 0 | OUTER |
| GROUP 2 | 504 505 506 507 508 509 510 511 | 1F8 1F9 1FA 1FB 1FC 1FD 1FE 1FF | 104 105 107 106 102 103 101 100 | 000100000 000100000 000100000 000100000 000100000 000100000 000100000 000100000 | 100 101 111 110 010 011 001 000 | 1 1 1 1 1 1 1 1 | out1 out2 out3 out4 out5 out6 out7 out8 |
| GROUP 3 | 512 513 514 515 516 517 518 519 | 200 201 202 203 204 205 206 207 | 300 301 303 302 306 307 305 304 | 001100000 001100000 001100000 001100000 001100000 001100000 001100000 001100000 | 000 001 011 010 110 111 101 100 | 0 0 0 0 0 0 0 0 | |
| GROUP 4 | 520 521 522 523 | 208 209 20A 20B | 30C 30D 30F 30E | 001100001 001100001 001100001 001100001 | 100 101 111 110 | 1 1 1 1 | INNER |

FIG.7

| GROUP | READ ADDRESS | | | GRAY CODE | | P | |
|---|---|---|---|---|---|---|---|
| | Dec | Hex | Hex | H_GRAY | L_GRAY | | |
| | ⋮ | ⋮ | ⋮ | ⋮ | ⋮ | ⋮ | ---- OUTER |
| GROUP 1 | 500 | 1F4 | 10E | 000100001 | 110 | 0 | |
| | 501 | 1F5 | 10F | 000100001 | 111 | 0 | |
| | 502 | 1F6 | 10D | 000100001 | 101 | 0 | |
| | 503 | 1F7 | 10C | 000100001 | 100 | 0 | |
| GROUP 2 | 504 | 1F8 | 104 | 000100000 | 100 | 1 | |
| | 505 | 1F9 | 105 | 000100000 | 101 | 1 | |
| | 506 | 1FA | 107 | 000100000 | 111 | 1 | |
| | 507 | 1FB | 106 | 000100000 | 110 | 1 | |
| | 508 | 1FC | 102 | 000100000 | 010 | 1 | |
| | 509 | 1FD | 103 | 000100000 | 011 | 1 | |
| | 510 | 1FE | 101 | 000100000 | 001 | 1 | |
| | 511 | 1FF | 100 | 000100000 | 000 | 1 | |
| GROUP 3 | 512 | 200 | 300 | 001100000 | 000 | 0 | — in8 |
| | 513 | 201 | 301 | 001100000 | 001 | 0 | — in7 |
| | 514 | 202 | 303 | 001100000 | 011 | 0 | — in6 |
| | 515 | 203 | 302 | 001100000 | 010 | 0 | — in5 |
| | 516 | 204 | 306 | 001100000 | 110 | 0 | — in4 |
| | 517 | 205 | 307 | 001100000 | 111 | 0 | — in3 |
| | 518 | 206 | 305 | 001100000 | 101 | 0 | — in2 |
| | 519 | 207 | 304 | 001100000 | 100 | 0 | — in1 |
| GROUP 4 | 520 | 208 | 30C | 001100001 | 100 | 1 | |
| | 521 | 209 | 30D | 001100001 | 101 | 1 | |
| | 522 | 20A | 30F | 001100001 | 111 | 1 | |
| | 523 | 20B | 30E | 001100001 | 110 | 1 | ---- INNER |

FIG.8

DATA RECORDING APPARATUS FOR FAST DETECTION OF SERVO SECTORS AND CORRECTION OF TRACK ADDRESS USING A DIVIDED GRAY CODE AND A PARITY BIT

CROSS REFERENCE TO RELATED APPLICATIONS

The subject matter of the present application is related to that in co-pending applications Ser. Nos. 08/653,968, entitled "Method for Detecting Data Stroke for Disk Drive", filed May 28, 1996; May 30, 1996; 08/658,099, entitled "Method for Generating Index Pulse with Index Pattern", filed Jun. 4, 1996; 08/657,665, entitled "Servo Information Recording Method for a Magnetic Recording Medium", filed May 31, 1996; 08/659,737, entitled "Data Sector Pulse Generating Method", filed Jun. 6, 1996; and 08/661/491, entitled "Method for Determining a Position of Track-Zero and Mapping Tracks According Thereto, filed Jun. 11, 1996, incorporated herein by reference.

FIELD OF THE INVENTION

The present invention relates to a servo pattern of a disk driving/recording apparatus, and more particularly, to a servo sector forming method for fast detection and corresponding track address correcting method.

BACKGROUND OF THE INVENTION

A hard disk drive, that is, a disk driving/recording apparatus, for magnetically recording the data received from an external device (e.g., a host computer) onto a rotating disk or reading data recorded on the disk is widely used for an auxiliary memory device of a computer system. A conventional hard disk drive is largely divided into a mechanism unit and a circuit unit, which will now be described in detail.

The circuit unit of a hard disk drive includes a read/write channel circuit for reading a magnetic signal from a magnetic recording medium (disk) and converting that signal into a digital signal, a disk data controller for performing communication with a host computer, a servo driver for moving a head into a specific position of the disk, and a microcontroller for performing overall controlling operation of the hard disk drive. Hereinbelow, the mechanism unit of the hard disk drive will be described schematically with reference to FIGS. 1 and 2.

FIG. 1 is a general plan view of a hard disk drive, in which head 4 fixed in one end of head gimbal assembly (HGA) 6 of swing arm 8 moves on disk 2 radially around the shaft of a pivot bearing 10 under control by a voice coil motor (VCM) 12. Head 4 moves to a predetermined track on disk 2 under control of a microcontroller to read or write data.

FIG. 2 is a partial side view of a hard disc drive schematically illustrating the relationship between the HDA and servo driver, in which head 4 is positioned on the surface of disk 2 and is installed in arm 8 extended vertically with respect to the arm assembly of VCM 12. A spindle motor 14 rotates disk 2 at a constant speed under control of the servo driver. Hereinbelow, a general format of a track disposed concentrically on disk 2 will be described.

FIG. 3 is a plan view of a disk illustrating a predetermined track among tracks disposed concentrically on disk 2, FIGS. 4A and 4B are a sector format diagram illustrating a data sector and a servo sector alternatively positioned on a predetermined track illustrated in FIG. 3, and a detailed servo sector format diagram, respectively. Referring to FIG. 4A, the tracks disposed concentrically on disk 2 are largely divided into a data sector and a servo sector.

Generally, user data is recorded onto the data sector and position information of head 4 (i.e., track address and servo information) is recorded onto the servo sector. The servo sector is divided into an auto gain control field (AGC), a gap field (GAP), an index field (IDX), a gray code field and a burst field, as illustrated in FIG. 4B. Since the frequencies of signals recorded onto the data sector and servo sector are different from each other, a gain is readjusted in the AGC field when head 4 is transferred from the data sector to the servo sector.

The gap field is a signal-free region due to the generation of a synchronization signal for detecting the synchronizing point of time of the servo sector field. The index field is a field where a signal indicating information of one rotation of disk 2 is recorded. The gray code field is a field where the track address is recorded. The gray code field is a reference point when head 4 moves to a target track.

The burst field is a field where information for allowing head 4 to maintain an on-track state on the target track is recorded. In the conventional hard disk drive having a disk divided into the servo sector and data sector, the movement of the head to the target track is controlled using the gray code. In other words, the distance between the head and target track is calculated by using the gray code read from a predetermined track during the movement to the target track.

According to the calculation result, a voice coil motor (VCM) 12 is controlled to position head 4 on the target track exactly. At this time, head 4 should cross at least one gray code field completely. The reason of the foregoing will now be described in detail with reference to FIG. 5.

FIG. 5 illustrates loci of a head moving on a servo sector during a track detection. Figure 5A is a detailed format diagram of a specific servo sector on a predetermined track, Figure 5B illustrates the arrangement of a servo sector of a group of predetermined tracks 2n–1 through 2n+8, and FIG. 5C illustrates a head locus AA for the gray code field of the track 2n+4. Referring to FIG. 5, to read the gray code exactly during a track detection, head 4 must cross the tracks in a head locus AA illustrated in FIG. 5B. Head 4 must cross the field of the servo sector in which the gray code for at least one track is recorded in order to read the track address exactly.

In FIG. 5, the address of track 2n+4 is read. If head 4 travels crossing a group of tracks in a head locus AB, the head movement is fast. However, the position of head 4 cannot be detected exactly. If head 4 travels in a head locus AA during each track detection, head 4 should stop at one track among the group of tracks as long as the gray code field. This impedes the reduction of track detection time. The longer the gray code is, the more the track detection time is delayed.

In prior art high capacity hard disk drives, gray code length may be extended in proportion to the increment of tracks. Thus, if the track detection is performed in a conventional way, the physical detection time of the head is delayed, which retards data access.

SUMMARY OF THE INVENTION

Therefore, it is an object of the present invention to provide a servo pattern recording method which can maintain a track detection time irrespective of extension of a gray code field.

It is another object of the present invention to provide a track address correcting method which can detect a track address in which a head is positioned by reading a gray code in a hard disk drive having a disk on which a separative gray code is recorded.

To accomplish the above objects, according to the present invention, there is provided a track address correcting method for a disk driving/recording apparatus using as a recording medium a disk comprised of a plurality of track groups by incorporating a plurality of tracks in a group. Each group may have a data sector and a servo sector with a gray code field separated into a higH_gray code field and a low-gray code field, a gap field for supplying the synchronization point of time and a parity bit field in which a group change information is recorded. The gray code read from the higH_gray code field and low-gray code field is decoded during a track detection to detect a read address. A correction value for correcting a track address according to the track detection direction is added to the read address to detecting the track address.

BRIEF DESCRIPTIONS OF THE DRAWINGS

FIG. 7 is a table for explaining a track address correcting procedure when detecting outer tracks, according to an embodiment of the present invention.

FIG. 8 is a table for explaining a track address correcting procedure when detecting inner tracks, according to an embodiment of the present invention.

DETAILED DESCRIPTION OF THE INVENTION

Hereinbelow, various detail items such as the number of gray code bits or field lengths described in the following explanation and accompanying drawings are provided for better understanding the present invention. However, it will be apparent to those of ordinary skill in the art that the present invention may be embodied without these detail items. Also, the detailed explanation for well-known functions and components which may obscure the gist of the present invention will be omitted herein.

Figure 1:
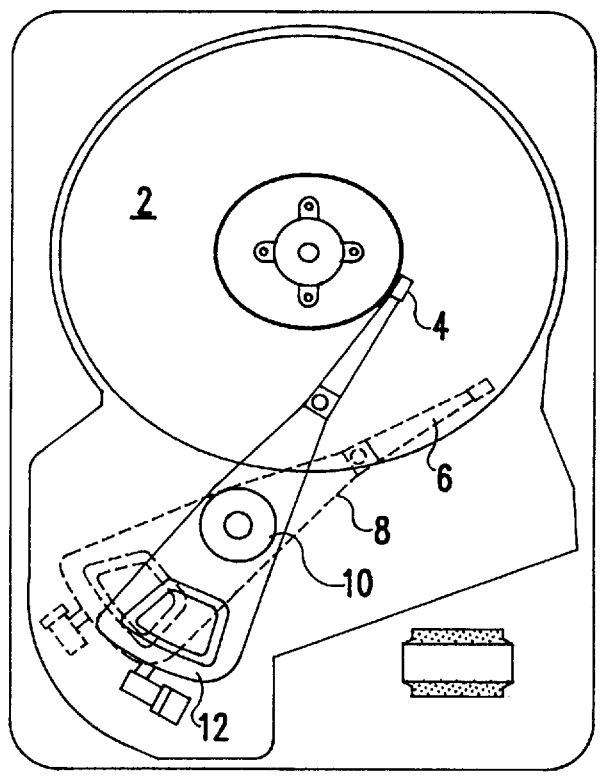
FIG. 1 is a plan view of a general hard disk drive.
Figure 2:
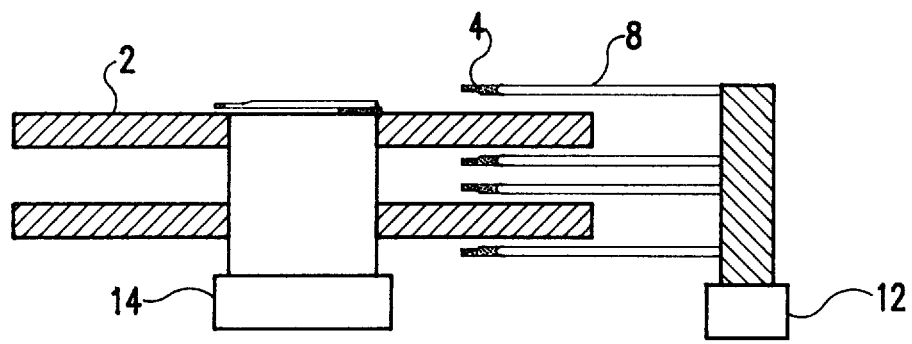
FIG. 2 is a partial side view of a hard disk drive illustrating the relationship between a head disk assembly (HDA) and a servo driver.
Figure 3:
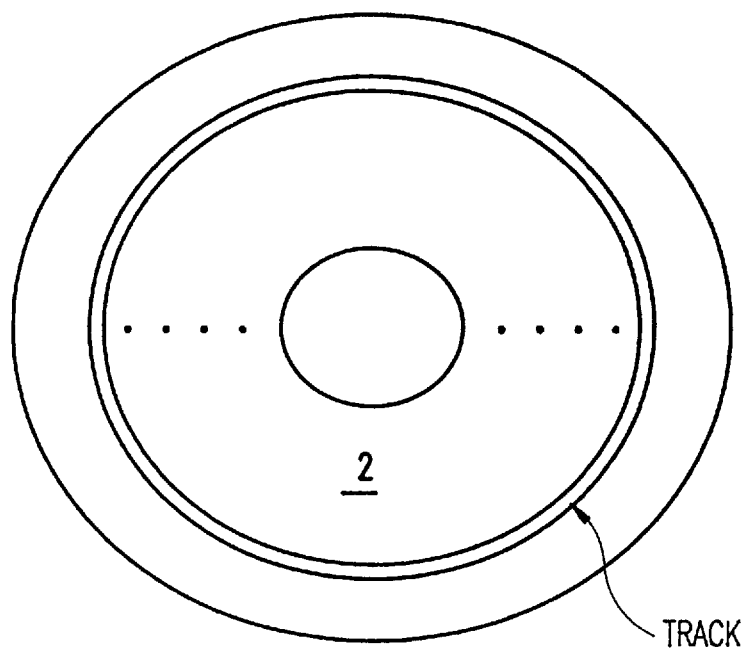
FIG. 3 is a plan view of a disk illustrating a predetermined track on the disk as a magnetic recording medium.
Figure 4:
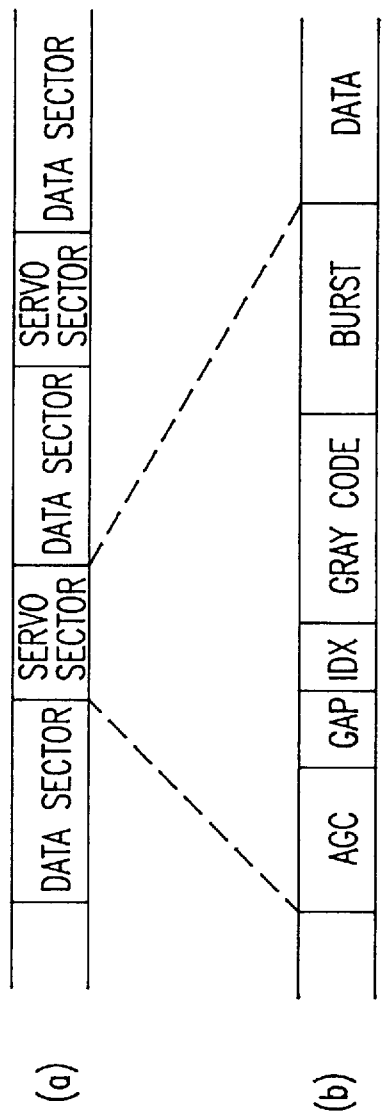
FIGS. 4A and 4B are a sector format diagrams illustrating a data sector and a servo sector alternatively positioned on the predetermined track illustrated in FIG. 3, and a detailed servo sector format diagram, respectively.
Figure 5:
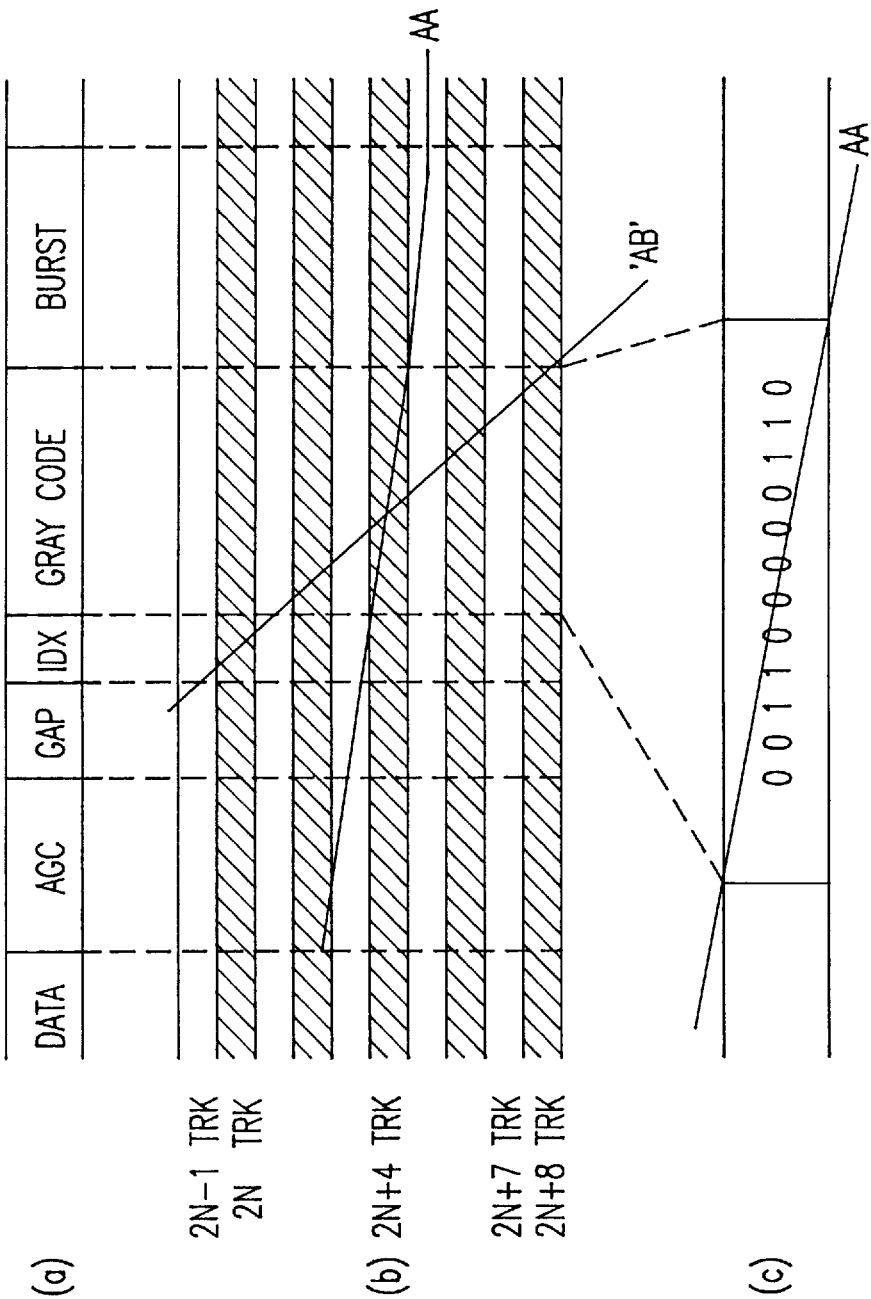
FIG. 5 is a diagram illustrating the locus of a head moving on a coventional servo sector during a track detection.
Figure 6:
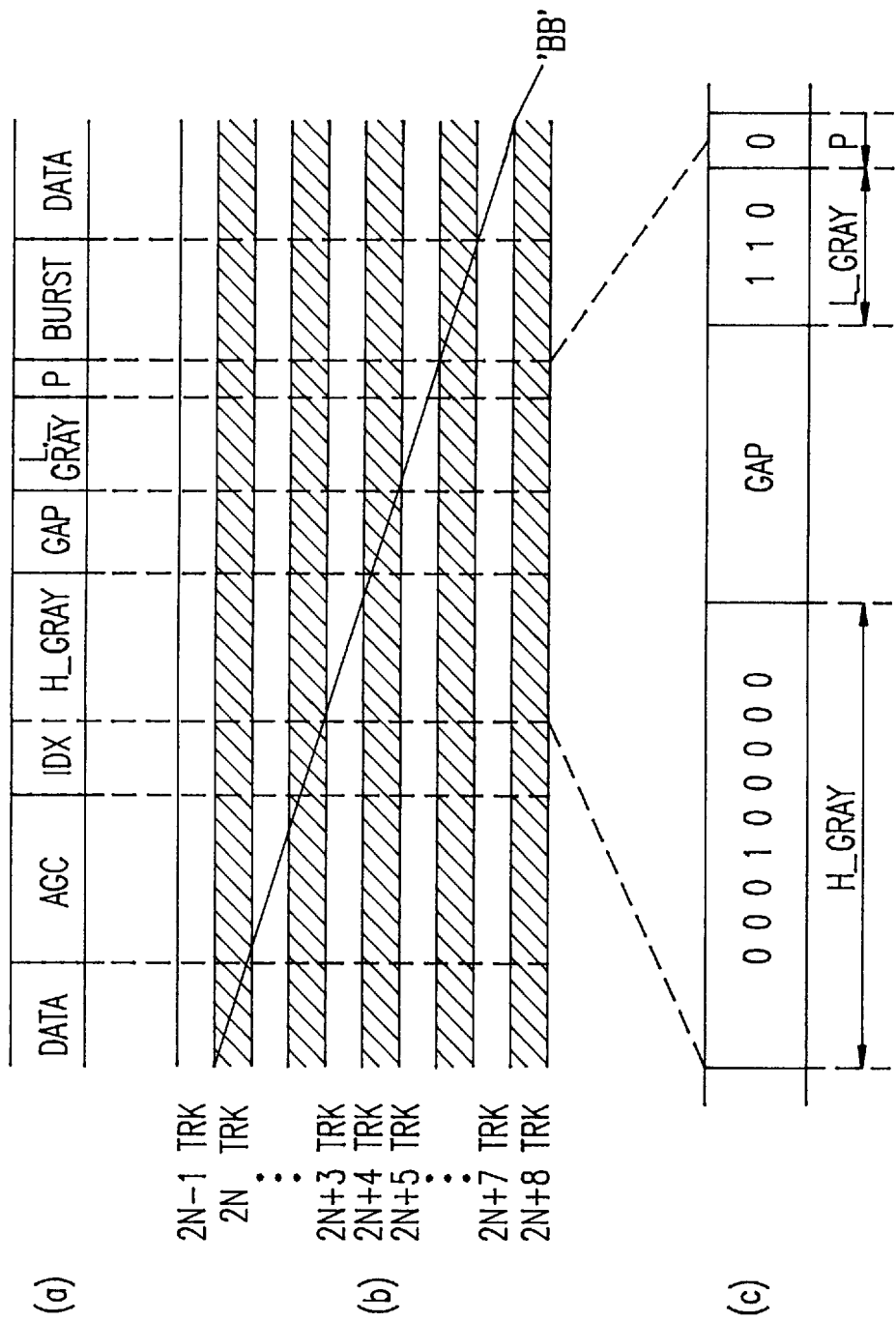
FIG. 6 illustrates the locus of a head moving on a servo sector according to the present invention during a track detection.

FIG. 6 illustrates the locus of a head moving on a servo sector according to the present invention during a track detection. FIG. 6A is a detailed format diagram of a servo sector according to the present invention. FIG. 6B illustrates the arrangement of a servo sector for a predetermined group of tracks 2n–1 through 2n+8 having the configuration of the servo sector according to the present invention. FIG. 6C illustrates bit information of the gray code field read from the tracks 2n+3, 2n+4 and 2n+5 for head locus BB during track detection.

The servo sector according to the present invention includes an AGC field, an IDX field, a high (H)_gray code field, a GAP field, a low (L)_gray code field, a parity field and a burst field, as illustrated in FIG. 6A.

Among the gray codes, the H_gray code field is the field in which partial upper bits (i.e., 9 bits in the present invention, as illustrated in FIG. 6C) are recorded. The L_gray code field in which the lower bits except the upper bits (i.e., 3 bits in the present invention, as illustrated in FIG. 6C). The parity field P positioned in the rear of the L_gray field is toggled whenever the L_gray code field generates a carry and is recorded as 1 bit. The GAP field is preferably positioned between the H_gray code field and the L_gray code field.

At that time, the 1 bit is defined as a parity bit, by which the change of the group can be identified depending on the parity bit during the track detection. The above-described group implies the group of tracks separated into one group and is determined by the number of bits composing the L_gray code. In the embodiment of the present invention, since the L_gray code is composed of 3 bits, 8 tracks can be defined as one group.

Hereinbelow, the track address correcting method will be described with reference to FIGS. 7 and 8, in an example where head 4 performs detection for both inner and outer tracks on a disk in which the servo sector according to the present invention is recorded.

FIG. 7 is a table for explaining a track address correcting procedure when detecting an outer track, according to an embodiment of the present invention. In FIG. 7, each group is composed of 8 tracks, a read address is a decoded gray code and is represented by decimal and hexadecimal numbers, respectively. The gray code is composed of 9-bit H_gray and 3-bit L_gray. Parity bit P represents a value toggled by the group change.

Now, the track address correcting method for exactly detecting the track address in which head 4 is positioned using the gray code value read during the detection toward the outer tracks will be described. First, it is assumed that head 4 passes via group 3 and reads L_gray code "110" of group 2, for example. The H_gray code may be read as "001100000" in group 3 and the L_gray is read as "110". At this time, the parity bit is toggled from "0"to "1". indicating that the groups are changed. The H_gray and L_gray are combined and then 12 bits are formed to be 306 Hex, where the read address becomes 516.

However, in practice, since head 4 is positioned at "out4" (i.e., read address 507), the read address 516 is wrong. This difference is generated because head 4 reads the gray code while it passes the group 3 toward the group 2. Therefore, the read address should be corrected to detect an exact track address in which head 4 is practically positioned. At this time, the following equation is adopted, which is defined as a track address correcting equation.

$$\begin{aligned}
\text{Track address} &= \text{Read address} + \text{correction value} \\
&= \text{Read address} + [-\text{mode 8(read address)}] \times 2 - 1 \\
&= 516 + [-4] \times 2 - 1 \\
&= 507
\end{aligned}$$

From the above track address correcting equation, the correction value is for correcting the read address and is obtained by converting the read address represented by a decimal number into a binary number and then representing the lower 3 bits as a decimal number. In other words, read address 516 illustrated in the embodiment of the present invention is represented as "001000000100" in a binary notation. The lower 3 bits are represented as "4" in a decimal notation. As a result, the track address is detected as 507. The track address 507 is the same as the read address (Dec) of "out4" illustrated in FIG. 7. The aforementioned track addres s correcting equation is adopted when the group has changed but is not adopted when the H_gray and L_gray are read in the same group.

FIG. 8 is a table for explaining a track address correcting procedure when detecting inner tracks, according to an embodiment of the present invention, in which the group, read address, gray code and parity bit are the same as those described in FIG. 7. The track address correcting method for exactly detecting the track ack address in which head 4 is positioned using the gray code value read during the detection toward the inner tracks will be described.

First, it is assumed that head 4 passes via group 2 and reads the L_gray "110" of a group 3, for example. The H_gray is read as "000100000" in group 2 and the L_gray is read as "110". At this time, the parity bit is toggled from "1" to "0". Thus, it is understood that the groups are changed. The H_gray and L_gray are combined and then 12 bits are formed to be 106Hex, where the read address becomes 507.

However, in practice, since head 4 is positioned at "in4" (i.e., read address 516), the read address 507 is wrong. This difference is generated because head 4 reads the gray code while it passes the group 2 toward the group 3. Therefore, the read address should be corrected to detect an exact track address in which head 4 is practically positioned. At this time, the following equation is adopted, which is defined as a track address correcting equation.

$$\begin{aligned}
\text{Track address} &= \text{Read address} + \text{correction value} \\
&= \text{Read address} + [8 - \text{mode } 8(\text{read address})] \times 2 - 1 \\
&= 507 + [8 - 3] \times 2 - 1 \\
&= 516
\end{aligned}$$

From the above track address correcting equation, the correction value is obtained by converting the read address represented by a decimal number into a binary number and then representing the lower 3 bits as a decimal number. In other words, the read address 507 illustrated in the embodiment of the present invention is represented as "000111111011" in a binary notation. The lower 3 bits are represented in a decimal notation so that the mode 8 is "3".

As a result, the track address is detected as 516. The track address 516 is the same as the read address (Dec) of "in4" illustrated in FIG. 8. The aforementioned track address correcting equation is adopted when the group has changed but is not adopted when the H_gray and L_gray are read in the same group, as in outer track detection.

The following Table 1 indicates correction values resulted by the track address correcting equations each used for outer track detection and inner track detection.

TABLE 1

| Lower 3 Bits | Correction Value A | Correction Value B |
|---|---|---|
| 000 | 1 | 15 |
| 001 | 3 | 13 |
| 010 | 5 | 11 |
| 011 | 7 | 9 |
| 100 | 9 | 7 |

TABLE 1-continued

| Lower 3 Bits | Correction Value A | Correction Value B |
|---|---|---|
| 101 | 11 | 5 |
| 110 | 13 | 3 |
| 111 | 15 | 1 |

In Table 1, the lower 3 bits are obtained by converting the read address represented as a decimal number and then representing the lower three bits of the same. The correction value A represents the correction result during the outer track detection. The correction value B represents the correction result during the inner track detection.

In other words, the gray code read during the outer and inner track detection is converted into binary code and then the value corrected using the low 3 bits is added to the read address to correct the track address, thereby detecting the current track position of a head exactly.

As described above, according to the present invention, a track detection time can be maintained in a high-capacity hard disk drive, irrespective of extension of a gray code field.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A servo sector on a data-recording medium, comprising:

a first gray code field containing first address information;

a second gray code field containing second address information;

a gap field positioned between the first and second gray code fields; and a parity bit field containing a parity bit.

2. The servo sector recited in claim 1, further comprising: an auto gain control field for adjusting gain of a signal detected from a data sector and a servo sector of the data-recording medium.

3. The servor sector recited in claim 1, further comprising: a burst field in which a position error signal for an on-track control of a data-reading head is recorded.

4. The servo sector recited in claim 1, wherein the data-recording medium is a rotating disk.

5. The servo sector recited in claim 4, wherein the data-recording medium is a magnetic-recording disk.

6. The servo sector recited in claim 4, further comprising: an index field in which rotation information of the data-recording medium is recorded.

7. The servo sector recited in claim 1, wherein the first address information includes only upper address information for the track, and the second address information includes only lower address information for the track.

8. The servo sector recited in claim 7, wherein the first address information is nine bits in length, and the second address information is three bits in length.

9. The servo sector track recited in claim 1, wherein the parity bit recorded into the parity bit field is one-bit and is toggled whenever the second address information generates a carry.

10. A disk driving/recording apparatus, comprising:

a data-recording disk comprising a plurality of tracks, the tracks being formed into a plurality of sectors, the sectors including servo sectors and data sectors; and a read;write head for reading data from and writing data to the data-recording disk, wherein each of the servo sectors comprises:

a first gray code field containing first address information;

a second gray code field containing second address information;

a gap field positioned between the first and second gray code fields; and a parity bit field containing a parity bit.

11. The disk driving/recording apparatus recited in claim 10, wherein each of the plurality of servo sectors further comprises an auto gain control field for adjusting gain of a signal detected from a data sector and a servo sector of the recording medium.

12. The disk driving/recording apparatus recited in claim 10, wherein each of the plurality of servo sectors further comprises a burst field in which a position error signal for an on-track control of a data-reading head is recorded.

13. The disk driving/recording apparatus recited in claim 10, wherein each of the plurality of servo sectors further comprises an index field in which rotation information of the data-recording disk is recorded.

14. The disk driving/recording apparatus recited in claim 10, wherein the data-recording disk is a magnetic-recording disk.

15. The disk driving/recording apparatus recited in claim 10, wherein the first address information includes only upper address information for the track, and the second address information includes only lower address information for the track.

16. The disk driving/recording apparatus recited in claim 10, wherein the second address information contains sufficient bits to represent in binary the size of each of the plurality of groups.

17. The disk driving/recording apparatus recited in claim 10, wherein the plurality of tracks are formed into groups of nine tracks, the first address information is eight bits in length, and the second address information is three bits in length.

18. The disk driving/recording apparatus recited in claim 10, wherein the parity bit recorded into the parity bit field is one-bit and is toggled whenever the second address information generates a carry.

* * * * *